(No Model.) 3 Sheets—Sheet 1.

G. W. LEEVEY.
LEAF TURNER.

No. 425,810. Patented Apr. 15, 1890.

WITNESSES:
Charles W. Benjamin
Arden S. Fitch

INVENTOR.
George W. Leevey.
BY A. G. N. Vermilya
his ATTORNEY

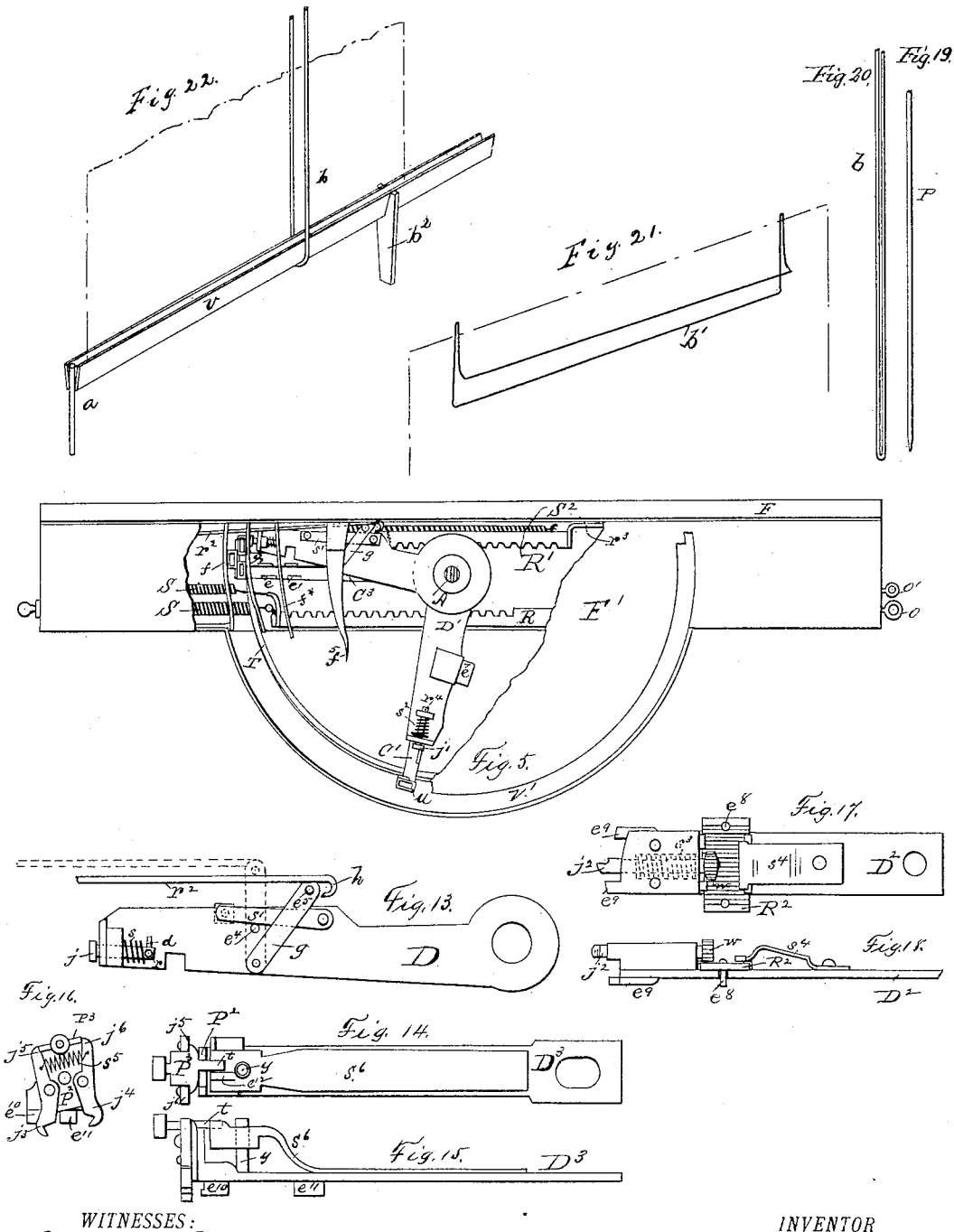

(No Model.)   3 Sheets—Sheet 3.
G. W. LEEVEY.
LEAF TURNER.
No. 425,810. Patented Apr. 15, 1890.
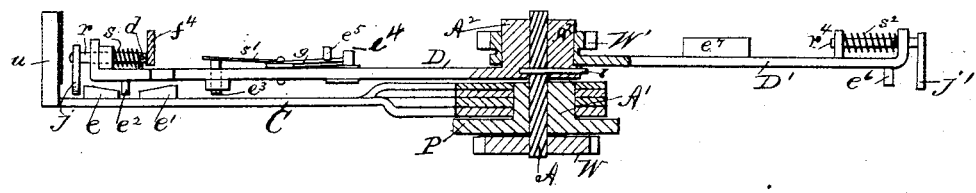
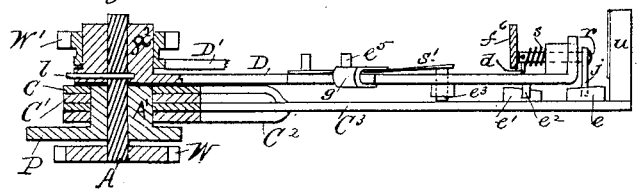
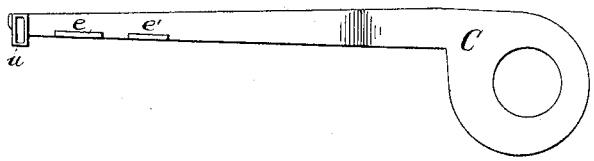
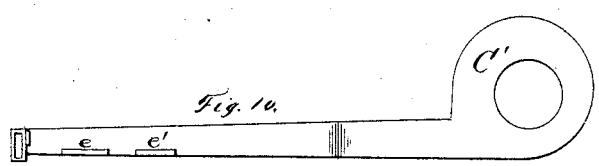
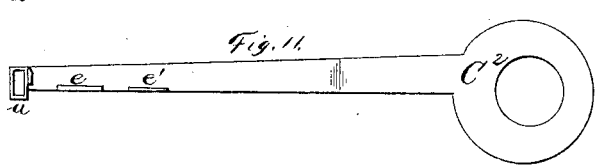
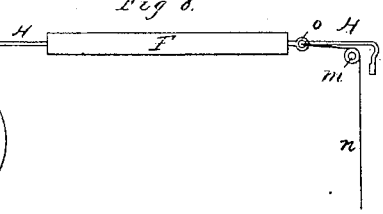
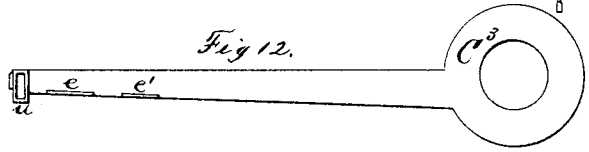
WITNESSES:
Charles W. Benjamin
Arden J. Fitch
INVENTOR
George W. Leevey,
BY A. G. N. Vermilye
his ATTORNEY

UNITED STATES PATENT OFFICE.

GEORGE W. LEEVEY, OF JERSEY CITY, ASSIGNOR TO WILLIAM A. OSBORN, OF WOODBRIDGE, NEW JERSEY.

LEAF-TURNER.

SPECIFICATION forming part of Letters Patent No. 425,810, dated April 15, 1890.

Application filed July 1, 1889. Serial No. 316,274. (No model.)

*To all whom it may concern:*

Be it known that I, GEORGE W. LEEVEY, a citizen of the United States of America, and a resident of Jersey City, in the county of Hudson and State of New Jersey, have invented certain new and useful Improvements in Leaf or Music Turners, of which the following is a specification, reference being had to the accompanying drawings, forming part of the same, in which—

Figure 3:
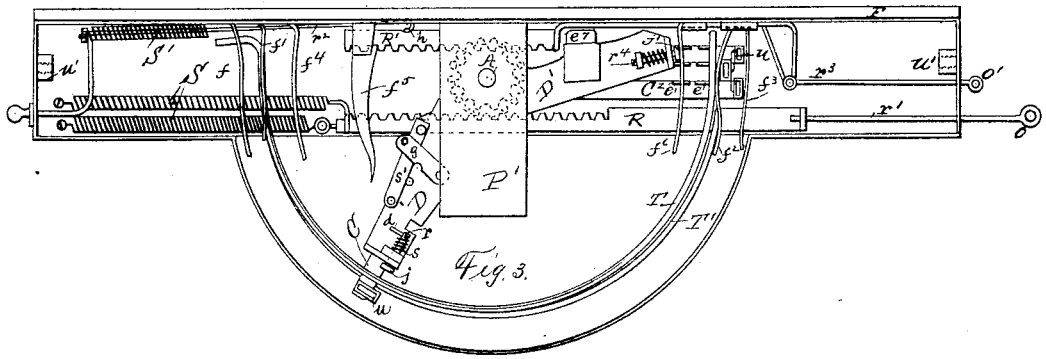
Figure 2:
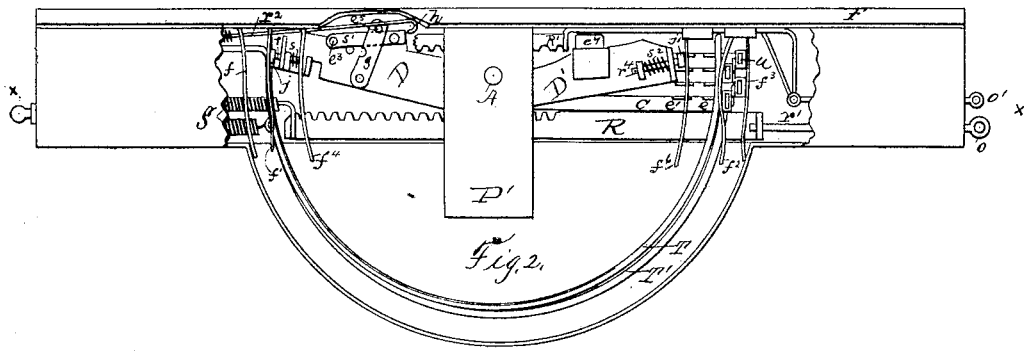
Figure 4:
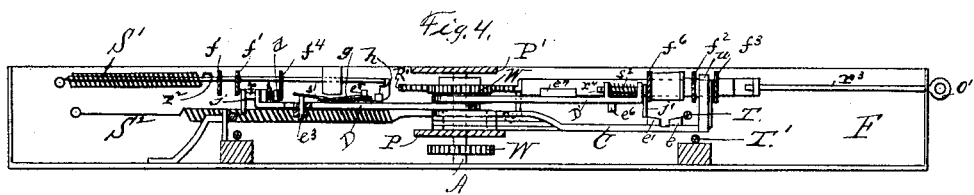
Figure 1:
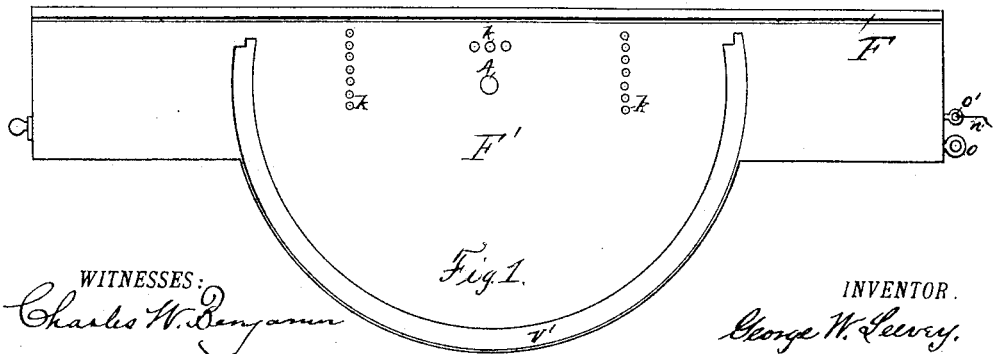

Figure 1 is an upper face view of the apparatus, not, however, showing the carriers. Fig. 2 is a plan view with a portion of the upper cover removed, the driving-arms being shown in normal position. Fig. 3 is a similar view with one driving-arm in operation. Fig. 4 is a vertical longitudinal sectional view on line $x\ x$, Fig. 2. Fig. 5 is a plan view showing the second driving-arm in operation. Fig. 6 is an enlarged view of some of the parts as seen in Fig. 4. Fig. 7 is a similar view of certain parts with the main driving-arm and the carriers at the right. Fig. 8 is a side elevation, showing one manner of applying the apparatus to a musical instrument, and Figs. 9 to 22 represent various details of the apparatus.

The object sought is an apparatus which will turn leaves (particularly of music) by other power than the hand, and yet with something of the dexterity, rapidity, and certainty which the hand possesses, so that accuracy may not be sacrificed and yet the use of both hands for purposes other than turning leaves permitted, and I believe that in the machine exhibited I have found that object so sought.

F is the frame upon which the other parts are supported. It consists in the present instance and usually of a piece of metal bent to form the bottom and back of the case or cover for the working parts, the angle being about a right angle. From the lower part of this frame a supporting-plate P extends inwardly, but preferably at about an angle of sixty degrees with the bottom of the case, and another plate P' extends in a similar direction from the upper part of the frame at a point directly over the lower plate. Formed on or secured to this lower plate P is a sleeve-axle A', surrounding but not concentric with the pivot A, which passes through P. Centrally upon A, and above A' another sleeve A² is placed, secured by pin $l$, and to A² is secured the main driving-arm D, moving in a plane at right angles to the axis of A. At the lower end below P, A is rigidly connected to a toothed wheel W. Upon A², as an axle, the hub of a second gear-wheel W' and a second driving-arm D' are mounted and fitted to rotate in unison, sometimes made in one piece. Carrier-arms C are mounted upon A', and, as shown in Figs. 9 to 12, I usually so construct them that when mounted their outer ends may all lie closely together and in one plane. (See Figs. 6 and 7.) Their outer ends are provided with carrier-sockets $u$, extending at right angles to the plane of movement of the arms. Stops $e\ e'$ are placed near the carrier ends of C, and two wires T T' support and sometimes guide the carrier-arms C, the carrier usually resting upon one and in front of the other. Secured to the outer end of this arm D is a pawl $j$, mounted on a rod $r$, extending through an upset part of D and having a short arm $d$ extending from one side, which, bearing against the arm D, permits no movement of the pawl $j$ in one direction beyond the perpendicular. A spring $s$, interposed between the extremity of D and $d$, holds pawl $j$ normally against the upset end of D. Stops $e^2$ and $e^3$ are placed upon this arm, the first low enough to engage $e$ or $e'$ and narrow enough to pass between them, which it will do when D has carried C over to its position at the left of the machine, the other $e^3$ passing through an aperture in D (for strength) and secured to a leaf-spring $s'$, which normally holds it above the carrier-arms C. Over this leaf-spring extends a strap $g$, secured to D, in such relation to $e^3$ that when pushed forward it will force $e^3$ down below the level of the upper surface of C, and when pushed backward it will permit the spring to raise $e^3$ to its normal position above the level of C. A stop $e^4$ prevents $g$ from being moved too far forward, and a post $e^5$ is provided, for a purpose to be presently explained.

At the bottom of the case, in front of and meshing with W, is a rack-bar R, one end of which is attached to one or more springs S S, secured to the frame F, and the other is secured to a rod or wire $r'$, extending through the case, and usually provided with an eye $o$ at its outer end.

Spring clips or fingers $f$ extend horizontally inward from the rear of the frame, two $f$ $f'$, so arranged that when sockets $u$ are brought to that side of the machine they will be held there against unintentional displacement by their pressure. $f^2$ $f^3$ perform a similar office at the opposite side. Another finger $f^4$ extends from said frame at such a distance from the axis of the orbit of D, and is so bent that it will engage the inner end of $r$ when D has nearly reached its limit of motion, and forcing it outward against the stress of $s$ will enable pawl $j$ to clear stop $e$ and assume its normal position. $f^5$ is a somewhat similar finger, which engages post $e^5$ on strap $g$ and forces it back as D assumes its normal position, thus preventing its being stopped by the engagement of $e^3$ with C. A lever $r^2$ is journaled in the frame and provided with a hook $h$, which is placed so that when drawn out the hook will engage $e^5$ and draw strap $g$ forward, $e^5$ then passing under $f^5$, which has an offset at that point to permit such passage, and this having been accomplished the lever is retracted by a spring S', placed upon it and properly secured. Arm D' is also provided with a pawl $j'$ and stop $e^6$, arranged just reversely to $j$ and $e^2$ on D, and the spring $s^2$ tends to force the rod out instead of holding it close to D', as S does $j$ to D.

A buffer $e^7$ is held in a recess, which buffer acts to deaden the noise of operation and prevent disarrangement by too violent contact of the metal parts.

$f^6$ is another finger, which, when D' approaches the limit of its reverse motion, bears against $r^4$ and forces it back against the stress of $s^2$ sufficiently to permit $j''$ to pass within the line of $e'$ and allow D' to reach its extreme position, the stop $e^6$ also passing inside of $e'$.

The stops $e^2$ and $e^6$ on D and D' are so placed that the pawl on D can only pass over the stop of one carrier-arm at a time at the right and that on D' can only pass over one of said stops at a time at the left.

$b$ is a leaf-support, usually formed of a stiff steel wire bent in U form, the bight being of proper size to fit in the carrier-socket $u$.

$p$ is a fastening-pin to hold the book or sheets in proper place, and $b'$, Fig. 21, is a leaf-brace made of light wire and sometimes placed upon the top of the leaf to prevent buckling. If there be but one loose leaf, I sometimes employ a modified form of leaf-support, (such as shown in Fig. 22,) consisting of a long U-shaped piece of metal $v$, provided with a pivot $a$, which may be inserted in a recess conveniently placed in A, a support proper $b$, secured to this piece $v$, and a leg $b^2$, adapted to fit socket $u$. The support $b$ may be arranged to extend downward below $v$ and constitute the leg $b^2$.

Holes $k$ $k$ are provided in the face-plate, and clamps H, Fig. 8, which screw into threaded sockets $u'$ on the frame, Fig. 3. A pulley $m$ is also employed, and may be secured to any part either of the frame F or the instrument on which the turner is to be placed, care being taken to so arrange it that cords $n$ $n'$, led over it from $o$ $o'$, when drawn, will tend to draw out rods $r'$ or $r^3$. These cords are led down and secured to pedals $r^4$ $r^5$, so placed as to be conveniently operated by the feet.

The operation of the apparatus is as follows: The turner-clamps H are adjusted so that they will pass tightly over some part of the instrument upon which the turner is to be used—for instance, the frame of a piano—and hold the apparatus in place in front of the book-rest. The pulley $m$ is put in place, cords $n$ $n'$ led over it and to the pedals. The book is put in position, resting upon the upper face F'. A pin $p$ is put at the center to hold it, and other pins $p'$ $p^2$ in front of the leaves not to be used, to assist in holding the book firmly in place. Braces $b'$, if desired, are placed upon the leaves to be turned. Each of said leaves is inserted between the fingers of a support $b$, and these supports are respectively placed in sockets $u$ through slot $v'$ in the case, the parts being in the position shown in Fig. 2. Now, when it is desired to turn a leaf from right to left, the pedal connected with $n$ is depressed. This draws out rod $r'$ and rack R, which, acting upon pinion W, rotates that and the arm D connected with it from left to right, bringing it over on the side where the carriers C are, $r$ being of course released from engagement with $f^4$ almost at the beginning of the movement and drawn back to position by the spring $s$, the axis of D and that of C, and the distance from the first to $e^2$ and J, and from the last to $e$ and $e'$ being so regulated that on the right-hand side $j$ will ride over $e$, and $e^2$ will stop against $e'$, thus preventing more than one carrier being seized at a time. Now the pedal is released, and spring S, acting through rack R and pinion W, returns driver-arm D to its original position. D drives C before it, for, as before noted, while pawl $j$ yields in one direction, it does not in the other, and therefore, having passed over $e$, bears against it from the other side when the reverse movement begins, and the leaf being in the holder or support $b$ is turned as C proceeds. As D approaches its limit of motion on the left, being pivoted eccentrically to C, and the throw to the left of the axis of C being less than that to the right, the relative positions of stops $e$ $e'$ and pawl $j$ and stop $e^2$ are altered, $j$ passes beyond $e$, $e^2$ between $e$ and $e'$, and C is released from the control of D, which passes on to its normal position. This operation is accelerated by the engagement of $r$ with $f^4$, which more rapidly forces $r$ and its suspended pawl $j$ beyond engagement with $e$. At the same time $u$ passes in between $f$ and $f'$, and is there held by the pressure of one or the other from accidental displacement, especially such as caused by suction when an adjoining leaf is moved away. Successive leaves are similarly turned.

If at any time it is desired to turn back (from left to right) all that have been turned over, D being at rest, the lever $r^2$ is drawn out, its hook engages post $e^5$, strap $g$ is drawn forward, depresses spring $s'$ and the stop thereon, the latter passes down behind the first carrier-arm brought over, and if D be moved to the right it will drive all the carrier-arms on that side before it, thus turning back all the leaves. $g$ is returned to place by the engagement of $f^5$ and $e^5$, as before specified, as arm D again comes to rest. If only one leaf is to be turned back, then the pedal connected with $o'$ is depressed, $r^3$ is extended, and rack R', moving to the right, rotates pinion W' and its driver-arm D' to the left. $r^4$, escaping from engagement with $f^6$, projects farther out, and the eccentricities of the throw of D' and of C being properly proportioned, (here made the same as that of D and C,) when D' reaches the left side, pawl $j'$ will ride over and catch against the reverse side of $e'$, further movement will be stopped by $e^6$, and the pedal being released spring $S^2$ will reverse R', W', and D', driving the last carrier back to the right and turning back the last leaf. The stop $e^6$ of pawl $j'$ moves out of engagement with $e'$ as they reach their limit of motion, as before set forth, $j'$ being assisted by the engagement of $r^4$ with $f^6$ and its consequent inward movement. Any number of successive leaves may be separately reversed in like manner.

Sometimes I provide the requisite eccentricity by loosely mounting $u$ upon T and T', they or a single substitute being set or bent eccentrically to the throw of the driver-arm, in which case I may dispense with arms C altogether; but I prefer to employ them. I then, too, sometimes employ a different form of driver—such, for instance, as are shown in Figs. 17 and 18 or 13, 14, and 15.

The main arm $D^2$ of Figs. 17 and 18 is similar to D, but the catch $j^2$ extends horizontally, not vertically. Its reverse side is an inclined plane, and it is surrounded by a spring $s^3$, which yields against pressure upon the outer end of the catch, and at the end is a pinion $w$. This pinion meshes with a rack $R^2$, much wider than $D^2$, arranged to move laterally across the face of $D^2$, its motion being limited by pins $e^8$, and its accidental movement being prevented by a spring $s^4$. It is intended to engage directly with the side of sockets $u$. It rides over one $j^2$, being forced back, is stopped by $e^9$, and then bearing against the reverse side of $u$ drives it before it when $D^2$ is moved. Having carried all the sockets over, it is brought violently back, and the rack $R^2$, striking against the frame or a post placed for that purpose, it is driven across the face of $D^2$, rotating $w$ and reversing the latch $j^2$, which will then have its inclined face the other way, and consequently will be ready to return the leaves it has already turned over, which being done another reversal of $j^2$ is similarly affected.

$D^3$ is another modification of the same idea, but arranged to engage a horizontally-placed carrier or socket connection. Stops $e^{10} e^{11}$ are provided for purposes above noted.

The end of $D^3$ is turned up, and at the top is notched. Upon the face of the upset portion is pivoted a plate $P^2$, to the top of which is secured a second plate $P^3$, with a tongue $t$ extending back through and beyond the notch in $D^3$ and also forward a short distance beyond $P^2$. Upon the face of this plate are pivoted two catches $j^3$ and $j^4$, reversely placed, the ends opposite the catches being provided with retractile springs, usually one, $s^5$, connecting the two catches. These ends $j^6 j^5$ bear against the opposite sides of $P^3$, and the catch ends are thereby prevented from vibrating on their pivots except toward one another and then back. As they and plate $P^3$ are turned on the pivot of the latter, first one catch will extend far enough from $D^3$ to engage and drive the carrier and then the other, when $t$ is pushed over to the other side. A spring $s^6$, with a stop $e^{12}$ on it, bears against tongue $t$ to hold it in position, and a post $y$ is preferably employed to steady $s$. This apparatus will ride over and then drive back a carrier, substantially as does D, and its attachments, and when a reversal is desired it is swung under two fingers—such as $f^5$—secured to the frame, one of which depresses $s^6$ until stop $e^{12}$ is below the level of tongue $t$, while the other bears against $P^3$ and oscillates it and its catches, putting $j^3$ down and $j^4$ up, when the arm being withdrawn spring $s^6$ carries $e^{12}$ upward against $t$ on the opposite side, and the driver is again ready to work, but in the opposite direction. A similar finger on the left-hand side of the frame will reverse the action and leave the catches ready to repeat the first action.

As appears from the foregoing, my machine will turn easily and correctly almost any given number of leaves, will turn them back one at a time, as by D', or all together, as by D, and yet it may be operated without the use of the hand—a matter of considerable moment to an organist or orchestra performer.

What I claim as my invention, and desire to secure by Letters Patent, is—

1. In a leaf-turner, the combination of a movable driving-arm, a movable carrier, the orbits of which driver and carrier near one limit of motion are somewhat eccentric one to the other, and an engaging device secured to one of said devices and adapted to engage the other, substantially as set forth.

2. In a leaf-turner, the combination of a movable driving-arm, a movable carrier, the orbits of which devices near one limit of motion are somewhat eccentric one to the other, an engaging device and a stop secured to either and adapted to engage the other of said devices, substantially as set forth.

3. In a leaf-turner, the combination of a movable driving-arm, a movable carrier, engaging devices (one of which is movable) secured to said arm and carrier and adapted to engage each other, and a finger secured near the limit of motion of said devices and substantially in the line of movement of said movable engaging device, but extending in a line out of the natural orbit of said engaging device, whereby said engaging device will, as the carrier approaches its limit of motion, be forced out of engagement with its opposite engaging device, substantially as set forth.

4. The combination of a driving-arm, a pinion rigidly connected thereto, a rack-bar placed where it will mesh with said pinions, a spring secured to said rack-bar and also to a fixed support, a catch and a stop secured to said driving-arm, and means for moving said rack-bar, substantially as set forth.

5. In a leaf-turner, the combination, with the driving-arm, of a reversible pawl or catch, substantially as set forth.

6. In a leaf-turner, the carrier composed of a leaf-support, a socket for mounting the same, and a support for said socket, substantially as set forth.

7. In a leaf-turner, the carrier composed of a leaf-support, a socket for mounting the same, and an arm for supporting and carrying said socket, substantially as set forth.

8. In a leaf-turner, a driving-arm provided with a stop secured to a spring, a strap pivoted to swing over said spring, and a hook arranged to engage said strap, substantially as set forth.

9. In a leaf-turner, the combination of the driving-arm provided with a catch and a stop, the carrier-arm provided with a socket, and one or more stops adapted to engage the catch and stop on the driving-arm, the orbit of the catch and stop upon the driving-arm and that of the stop on the carrier-arm being eccentric one to the other near the limit of motion, substantially as set forth.

Signed at New York city, in the county of New York and State of New York, this 3d day of June, A. D. 1889.

GEORGE W. LEEVEY.

Witnesses:
JOHN THORPE,
A. G. N. VERMILYA.